US010055969B2

(12) United States Patent
Schofield et al.

(10) Patent No.: US 10,055,969 B2
(45) Date of Patent: Aug. 21, 2018

(54) PROXIMITY MONITORING DEVICES AND METHODS (71) Applicant: MAXWELL FOREST PTY LTD, Darlinghurst, New South Wales (AU)

(72) Inventors: Anthony Mark Schofield, Canberra (AU); Matthew Charles Denton, Bronte (AU)

(73) Assignee: MAXWELL FOREST PTY LTD, Darlinghurst, New South Wales (AU)

( * ) Notice: Subject to any disclaimer, the term of this patent is extended or adjusted under 35 U.S.C. 154(b) by 6 days.

(21) Appl. No.: 15/518,741

(22) PCT Filed: Oct. 12, 2015

(86) PCT No.: PCT/AU2015/050620
§ 371 (c)(1),
(2) Date: Apr. 12, 2017

(87) PCT Pub. No.: WO2016/058041
PCT Pub. Date: Apr. 21, 2016

(65) Prior Publication Data
US 2017/0287312 A1 Oct. 5, 2017

Related U.S. Application Data (60) Provisional application No. 62/063,320, filed on Oct. 13, 2014.

(51) Int. Cl.
*G08B 21/24* (2006.01)
*G06F 1/32* (2006.01)
(Continued)

(52) U.S. Cl.
CPC ........... *G08B 21/24* (2013.01); *G06F 1/3206* (2013.01); *H04W 4/008* (2013.01); *H04W 4/80* (2018.02)

(58) Field of Classification Search
CPC ...... G08B 21/24; G06F 1/3206; H04W 4/008; H04W 4/023; H04M 1/7253
See application file for complete search history.

(56) References Cited

U.S. PATENT DOCUMENTS

2009/0164813 A1* 6/2009 Tu .................. H04B 1/1615
713/320
2010/0156624 A1 6/2010 Hounsell
(Continued)

FOREIGN PATENT DOCUMENTS

WO WO 01/08116 A2 2/2001
WO WO 2007/116211 A1 10/2007

OTHER PUBLICATIONS

PCT International Search Report and Written Opinion, PCT/AU2015/050620, dated Nov. 18, 2015, 13 pages.
(Continued)

*Primary Examiner* — Mohamed Barakat
(74) *Attorney, Agent, or Firm* — Fenwick & West LLP (57) ABSTRACT

Disclosed herein is a small form factor device comprising: a power source, a force sensor, a wireless communications module, and a processor. The processor is configured to implement a proximity monitoring process involving periodically operating the wireless communications module to transmit advertisements. The processor is also configured to determine whether device stationary criteria are satisfied based on force signals received from the force sensor and, if the device stationary criteria are satisfied: cause the wireless communications module to transmit a device stationary message; and cause the small form factor device to enter a power saving mode in which the proximity monitoring process is suspended.

17 Claims, 5 Drawing Sheets (51) Int. Cl.
*H04W 4/00* (2018.01)
*H04W 4/80* (2018.01)

(56) References Cited

U.S. PATENT DOCUMENTS

| | | | |
|---|---|---|---|
| 2014/0135042 A1* | 5/2014 | Buchheim | G01S 1/68 |
| | | | 455/456.6 |
| 2014/0173439 A1* | 6/2014 | Gutierrez | G08B 21/24 |
| | | | 715/727 |
| 2014/0218238 A1 | 8/2014 | Cooke et al. | |
| 2014/0302794 A1* | 10/2014 | Palin | H04B 17/00 |
| | | | 455/41.2 |

OTHER PUBLICATIONS

PCT International Search Report and Written Opinion, PCT Application No. PCT/AU2015/050620, dated Nov. 18, 2015, 13 pages.
Extended European Search Report for European Patent Application No. EP 15850465.4, dated Apr. 20, 2018, 7 Pages.

* cited by examiner

PROXIMITY MONITORING DEVICES AND METHODS

FIELD OF THE INVENTION

The present disclosure relates to devices and methods for use in proximity monitoring processes.

BACKGROUND OF THE INVENTION

Two often competing concerns in today's society are security and convenience.

People are increasingly looking to ways of increasing security—for example in terms of securing physical possessions.

At the same time, however, people are increasingly looking for convenience. As a generalisation, people do not generally want to carry additional bulky items, despite the fact that such items can increase security.

Electronic devices can be used to increase security, but in order to counter the general aversion of people have to carrying additional items, such devices must be small. Small devices, however, carry small batteries which either drain quickly and/or require relatively frequent recharging—both of which compromise the convenience to end users.

SUMMARY OF THE INVENTION

Described herein is a small form factor device comprising: a power source; a force sensor for sensing forces applied to the small form factor device and generating force signals based thereon; a wireless communications module powered by the power source, and a processor powered by the power source, wherein the processor is configured to: implement a proximity monitoring process involving periodically operating the wireless communications module to transmit advertisements; determine whether device stationary criteria are satisfied based on force signals received from the force sensor or the absence of force signals received from the force sensor, and if the device stationary criteria are satisfied the processor is further configured to: cause the wireless communications module to transmit a device stationary message; and cause the small form factor device to enter a power saving mode in which the proximity monitoring process is suspended.

If the small form factor device is determined to be in motion while in the power saving mode, the processor may be configured to: cause the wireless communications module to transmit a device in motion message; and cause the small form factor device to exit the power saving mode and resume a proximity monitoring process.

The device stationary criteria may be satisfied if no force signals are received from the force sensor for a predetermined time period.

The small form factor device may have a credit card type form factor.

The force sensor may comprise an accelerometer.

The force sensor may comprise a piezoelectric transducer.

The wireless communications module may be a Bluetooth communications module.

Also described herein is a computer-implemented method for operating a monitored device, the computer-implemented method comprising: implementing a proximity monitoring process involving periodically operating a wireless communications module of the small form factor device to transmit advertisements; determining whether device stationary criteria are satisfied based on force signals received from a force sensor of the small form factor device or the absence of force signals received from the force sensor, and if the device stationary criteria are satisfied: transmitting a device stationary message; and entering a power saving mode in which the proximity monitoring process is suspended.

If the monitored device is determined to be in motion while in the power saving mode, the method may further comprise: transmitting a device in motion message; exiting the power saving mode; and resuming a proximity monitoring process.

The device stationary criteria may be satisfied if no force signals are received from the force sensor for a predetermined time period.

The monitored device may have a credit card type form factor.

The force sensor may comprise an accelerometer.

The force sensor may comprise a piezoelectric transducer.

The wireless communications module may be a Bluetooth communications module.

Also described herein is a portable electronic device comprising: a power source; a wireless communications module powered by the power source; an output device; and a processing unit powered by the power source, wherein the processing unit is configured to: implement a proximity monitoring process involving monitoring for the receipt of periodic advertisement transmissions from a monitored device by the wireless communications module; if, during implementation of the proximity monitoring process alarm criteria are satisfied, operate the output to alarm, and if a device stationary message is received from the monitored device, the processing unit is further configured to: implement a power saving process in which the proximity monitoring process is suspended.

The portable electronic device may further comprise a location monitoring module, and wherein if a device stationary message is received from the monitored device, the processing unit may be further configured to: determine a monitored device sleep position using the location monitoring module, the monitored device sleep position being a position of the portable electronic device at or about the time the device stationary state message was received.

After determining the monitored device sleep position, the processing unit may be further configured to: periodically compare a current position of the portable electronic device to the monitored device sleep position to determine a current separation distance between the current position and the monitored device sleep position; and if the separation distance exceeds a predetermined allowable separation distance, operate the output to alarm.

The portable electronic device may further comprise a display, and wherein if the current separation distance exceeds the predetermined allowable separation distance the processing unit may be further configured to display the monitored device sleep position on the display.

The output may comprise a speaker, and wherein operating the output to alarm may comprise operating the speaker to emit an audible alarm.

Also described herein is a computer-implemented method for operating a monitoring device to monitor the location of a monitored device, the method comprising: implementing a proximity monitoring process involving monitoring for the receipt of periodic advertisement transmissions from the monitored device; raising an alarm if alarm criteria are satisfied during implementation of the proximity monitoring process, and if a device stationary message is received from the monitored device, implementing a power saving process in which the proximity monitoring process is suspended.

If a device stationary message is received from the monitored device, the method may further comprise determining a monitored device sleep position, the monitored device sleep position being a position of the monitoring device at or about the time the device stationary message was received.

After determining the monitored device sleep position, the method may further comprise: periodically comparing a current position of the monitoring device to the monitored device sleep position to determine a current separation distance between the current position and the monitored device sleep position; and raising an alarm if the separation distance exceeds a predetermined allowable separation distance.

If the current separation distance exceeds the predetermined allowable separation distance, the method may further comprise displaying the monitored device sleep position on a display.

Raising an alarm may comprise operating a speaker to emit an audible alarm.

BRIEF DESCRIPTION OF THE DRAWINGS

Illustrative embodiments of various aspects of the present description will now be described by way of non-limiting example only, with reference to the accompanying drawings. In the drawings.

Where possible, the same reference numerals have been used in the figures to represent the same or like features.

DETAILED DESCRIPTION OF THE EMBODIMENTS

Embodiments described herein generally relate to proximity monitoring processes in which a monitoring device monitors the proximity of a monitored device. Advantageously, the monitored device will be a small form factor electronic device and the monitoring device, and embodiments will be described with this in mind. If desired, however, the processes described herein could be implemented using larger form factor devices.

Generally speaking, the proximity monitoring processes involve configuring a small form factor device (i.e. a monitored device) and a portable electronic device (i.e. a monitoring device) such that the portable electronic device raises an alarm if it determines that it is separated from the small form factor device. By way of one example, the small form factor device may be carried with an item of importance to a user (e.g. housed in a wallet/purse, attached to a bag etc.) and the portable electronic device may be the user's mobile phone. If the user exits a building with their mobile phone but leaves the item of importance inside, an alarm is raised alerting the user to this.

Initially, a small form factor device (being an example of a suitable monitored device) and a portable electronic device (being an example of a suitable monitoring device) will be described. Following this, computer-implemented methods for configuring and operating these devices will be described.

Small Form Factor Device

Figure 1:
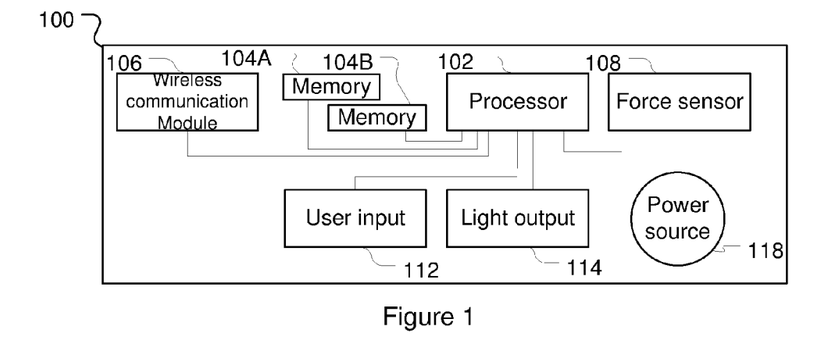
FIG. 1 is a block diagram of a small form factor wireless communication device in accordance with one embodiment.

FIG. 1 provides a block diagram of a small form factor device 100 in accordance with an embodiment.

As used herein, "form factor" refers to the physical dimensions of a device. Furthermore, the phrase "small form factor" is intended to indicate a form factor of an object or device that is small enough to be carried conveniently by a user. Without wishing to be limited by precise dimensions, examples of small form factor devices in this context include credit card shaped/sized devices, key-fob sized devices, token devices and the like. By way of contrasting example, a mobile phone sized device would not, in this context, be considered to have a small form factor. However, in other embodiments, the device 100 may be a larger form-factor device.

In some embodiments the small form factor device 100 has a credit card type form factor. As used herein, a credit card type form factor refers to a form factor having the general shape and size of a credit card but without necessarily having the precise dimensions of an ISO 7810 ID-1 compliant card. An ISO 7810 ID-1 compliant form factor has prescribed dimensions of 85.6 mm long×53.98 mm wide×0.76 mm thick. ISO 7810 ID-1 cards are commonly used as payment cards (e.g. credit and debit cards). A credit card type form factor may have zero or more dimensions as per an ISO compliant form factor and one or more dimensions that are smaller or larger than an ISO compliant form factor. For example, a credit card type form factor may have: the length of an ISO compliant form factor but a different width and different thickness; the width of an ISO compliant form factor but a different length and different thickness; the thickness of an ISO compliant form factor but a different length and width; the length and width of an ISO compliant form factor but a different thickness; the length and thickness of an ISO compliant form factor but a different width; the width and thickness of an ISO compliant form factor but a different length.

With appropriate miniaturisation of components, the small form factor device 100 may have an ISO compliant form factor.

Whether of a credit card type form factor generally, or an ISO 7810 ID-1 compliant form factor specifically, a device of these form factors can typically fit within a card slot of a wallet/card holder or the like.

Regardless of the specific form factor, device 100 generally comprises a processor 102, memory 104 for storing instructions executable by the processor 102 and data, and a wireless communication module 106 for enabling wireless communications with other devices (e.g., sending messages to other devices and receiving messages from other devices). In one embodiment the processor 102, memory 104 (which comprises both non-transient memory 104A (e.g., flash memory) and volatile memory 104B (e.g., RAM), and communication module 106 are provided in an integrated microcontroller unit (MCU) such as the CC2541 or CC2540 manufactured by Texas Instruments. In one embodiment, the communication module is a Bluetooth wireless communications module compliant with Bluetooth version 4.0/4.1 (also referred to as Bluetooth Low Energy (BLE)).

Device 100 also comprises a force sensor 108. As used herein, the term "force sensor" is used to generally describe devices/components that either sense forces (e.g. impact, pressure, compression, twisting/bending and the like) or the result of forces (e.g. acceleration) and output force signals in response thereto. In one embodiment, the force sensor is an accelerometer which outputs force signals in response to the detection of acceleration. By way of example, the force sensor may be an accelerometer such as the ADXL362 manufactured by Analog Devices.

In alternative embodiments the force sensor may be a piezoelectric transducer. For example, force sensor 108 may be a 7BB-20-6L0 piezoelectric sensor/transducer manufactured by Murata. The piezoelectric transducer outputs a voltage in response to a dynamic strain—for example in response to the device 100 coming into contact with a surface/object or being bent, compressed, or twisted. Use of a piezoelectric transducer has the advantage of detecting/ signalling the occurrence of force without drawing power from the device power source 118. In certain embodiments which make use of a piezoelectric force sensor 108, the device further comprises a high-pass filter (not shown) though which output from the piezoelectric force sensor 108 passes. Generally speaking, by using a high-pass filter voltages generated by the piezoelectric sensor in response to small forces applied to the small form factor device 100 are filtered out and do not reach the processor 102 (or, therefore, require processing by the processor 102 and the consumption of power that would be associated therewith). In addition, the high pass filter puts a voltage limiting resistor in line with the processor 102 which reduces the potential of damage to the processor input pin from high voltages generated by the piezoelectric transducer.

In certain embodiments, device 100 further comprises a user input 112 operable by a user to interact with the small form factor device 100. The user input 112 may be a simple push-button input, which sends a signal to the processor 102 when activated.

In certain embodiments, device 100 further comprises a light output 114. In this case light output 114 is controlled by the processor 102 in order to output visual signals to a user of the device 100. By way of example, light output 114 may be a LED, such as a 16-219A/S2C-AP1Q2/3T LED manufactured by Everlight.

The small form factor device 100 also comprises a power source 118. The power source 118 is connected to and powers those components the device 100 that require power (connections not indicated in FIG. 1 for clarity)—for example, the MCU (i.e. the processor 102, memory 104, and communications module 106), force sensor 108 (in the event an accelerometer is used and power is necessary), and (where included) light output 114. The voltage supplied by the power source 118 may exceed the voltage required by the MCU. In this case a DC-DC converter is used in order to step down the voltage of the power source 118 (in some cases the DC-DC convertor may be provided as part of the MCU chipset). In one embodiment power source 118 is a battery, such as a LiMn battery (for example manufactured by FDK). In some embodiments the power source 118 may comprise a rechargeable battery, either as the sole power source or in conjunction with a non-rechargeable battery. In this case the small form factor device 100 is also provided with contact points (not depicted) for connecting the small form factor device 100 to a charger to charge the rechargeable battery.

Each of the components of the small form factor device 100 has a size that allows the components to be embedded in a small form factor device (e.g. a credit card type form factor device, or an ISO 7810 ID-1 compliant device). Alternative components to those specifically mentioned are, of course, possible.

Where the small form factor device 100 has a credit card type form factor (either in a general sense or in an ISO compliant sense) manufacture of the device 100 may be a lamination process. For example, and generally speaking, device 100 may comprise multiple layers of materials encapsulated together into a credit card type form factor. One encapsulation process uses of a room temperature resin encapsulant. The relevant components (e.g. electronic components and battery) are provided in a wafer form positioned on a thin, flexible printed circuit board which forms a middle layer. This middle layer is then sandwiched between top and bottom card laminate surfaces to create the final assembly. Use of a room temperature resin encapsulant can have advantages over traditional hot lamination or injection moulding processes, both of which involve the application of heat and pressure which can be detrimental to electronic components.

As discussed in more detail below, the small form factor device 100 is configured for operation by one or more computer program modules. A computer program module may be a software module comprising computer readable instructions (and potentially data) stored in non-transient memory such as 104A. In order for the relevant functionality to be performed, a software module is typically loaded into transient memory such as 104B and executed by the processor 102. Computer program modules may alternatively be implemented in hardware, firmware, or in a combination of software, hardware and/or firmware.

Software and/or firmware instructions and data and may be transmitted to/received by the small form factor device 100 via a data signal in a transmission channel enabled (for example) by communications module 106.

In one embodiment device 100 is a payment card—e.g. a bank card, Visa card, MasterCard, American Express card or the like. In this case the device 100 will also be provided with components to enable the device 100 to be used as a payment card—e.g. a magnetic stripe with relevant encoded data, an EMV chip (EMV contact, contactless with antenna, or dual mode contact/contactless with antenna), or a combination thereof.

It will be appreciated that the functional components of device 100 may be provided by a variety of interconnected physical components. For example, in the embodiment described above the processor 102, communications module 104, and memory 106 are a physically integrated component. In alternative embodiments these may be separate physical components. It will also be appreciated that alternative embodiments of device 100 may be provided with additional, alternative, and or fewer components. For example, in some embodiments a light output may not be provided, and in other embodiments multiple light outputs may be provided.

The components and features of device 100 could, of course, be provided in a larger form-factor device if desired.

Portable Electronic Device

Figure 2:
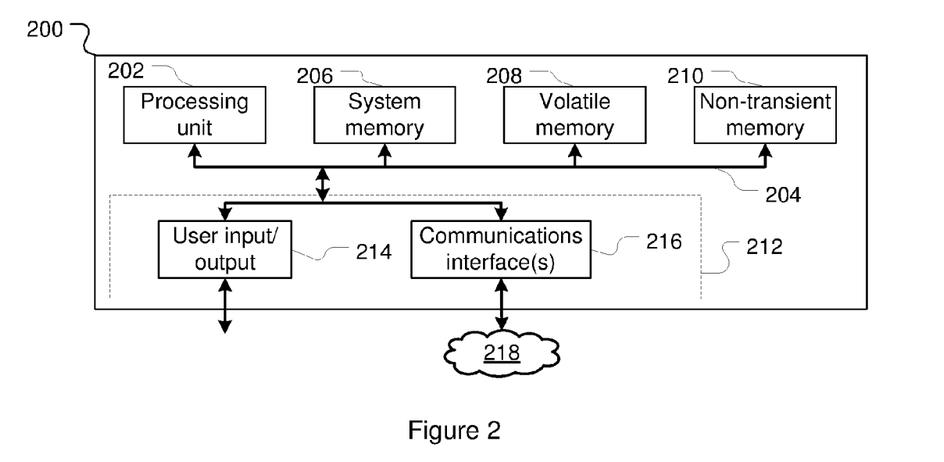
FIG. 2 is a block diagram of a portable electronic device in accordance with one embodiment.

Device 100 is configured to communicate with other computer processing systems, and in particular with a portable electronic device. FIG. 2 provides a block diagram of a portable electronic device 200 according to one embodiment.

The portable electronic device 200 comprises a processing unit 202. The processing unit 202 may comprise a single computer-processing device (e.g. a central processing unit, graphics processing unit, or other computational device), or may comprise a plurality of computer processing devices. In some instances processing is performed solely by processing unit 202, however in other instances processing may also, or alternatively, be performed by remote processing devices accessible and useable (either in a shared or dedicated manner) by the portable electronic device 200.

Through a communications bus 204 the processing unit 202 is in data communication with one or more machine-readable storage (memory) devices that store instructions and/or data for controlling operation of the portable electronic device 200. In this instance portable electronic device 200 comprises a system memory 206 (e.g. a BIOS), volatile memory 208 (e.g. random access memory such as one or more DRAM modules), and non-volatile/non-transient memory 210 (e.g. one or more hard disk or solid state drives).

Portable electronic device 200 also comprises one or more interfaces, indicated generally by 212, via which the portable electronic device 200 interfaces with various components, other devices and/or networks. Generally speaking, other components/devices may be physically integrated with the portable electronic device 200, or may be physically separate. Where such devices are physically separate from the portable electronic device 200, connection between the device and the portable electronic device 200 may be via wired or wireless hardware and communication protocols, and may be direct or indirect (e.g. networked) connections.

Wired connection with other devices/networks may be by any appropriate standard or proprietary hardware and connectivity protocols. For example, the portable electronic device 200 may be configured for wired connection with other devices/communications networks by one or more of: USB; FireWire; eSATA; Thunderbolt; Ethernet; Parallel; Serial; HDMI; DVI; VGA; AudioPort. Other wired connections are, of course, possible. Wireless connection with other devices/networks may similarly be by any appropriate standard or proprietary hardware and communications protocols. For example, the portable electronic device 200 may be configured for wireless connection with other devices/communications networks using one or more of: infrared; Bluetooth (e.g. Bluetooth 4.0/4.1, also known as Bluetooth low energy); Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are, of course, possible.

Generally speaking, the devices to which portable electronic device 200 connects—whether by wired or wireless means—allow data to be input into/received by portable electronic device 200 for processing by the processing unit 202, and data to be output by portable electronic device 200.

Example devices are described below, however it will be appreciated that not all portable electronic devices will comprise all mentioned devices, and that additional and alternative devices to those mentioned may well be used.

For example, portable electronic device 200 may comprise or connect to one or more input devices by which information/data is input into (received by) the portable electronic device 200. Such input devices may comprise physical buttons, alphanumeric input devices (e.g. keyboards), pointing devices (e.g. mice, track-pads and the like), touchscreens, touchscreen displays, microphones, accelerometers, proximity sensors, GPS devices and the like. Portable electronic device 200 may also comprise or connect to one or more output devices controlled by portable electronic device 200 to output information. Such output devices may comprise devices such as indicators (e.g. LED, LCD or other lights), displays (e.g. LCD displays, LED displays, plasma displays, touch screen displays), audio output devices such as speakers, vibration modules, and other output devices. Portable electronic device 200 may also comprise or connect to devices which may act as both input and output devices, for example memory devices (hard drives, solid state drives, disk drives, compact flash cards, SD cards and the like) which portable electronic device 200 can read data from and/or write data to, and touch-screen displays which can both display (output) data and receive touch signals (input).

Portable electronic device 200 may also connect to communications networks (e.g. the Internet, a local area network, a wide area network, a personal hotspot etc.) to communicate data to and receive data from networked devices, which may be other computer processing systems.

It will be appreciated that portable electronic device 200 may be any suitable computer processing system such as, by way of non-limiting example, a laptop computer, a netbook computer, tablet computer, a smart phone, a Personal Digital Assistant (PDA), a cellular telephone. It will also be appreciated that FIG. 2 does not illustrate all functional or physical components of a portable electronic device. For example, no power supply or power supply interface has been depicted, however portable electronic device 200 will carry a power supply (e.g. a battery). It will further be appreciated that the particular type of portable electronic device will determine the appropriate hardware and architecture, and alternative portable electronic devices may have additional, alternative, or fewer components than those depicted, combine two or more components, and/or have a different configuration or arrangement of components.

Figure 3:
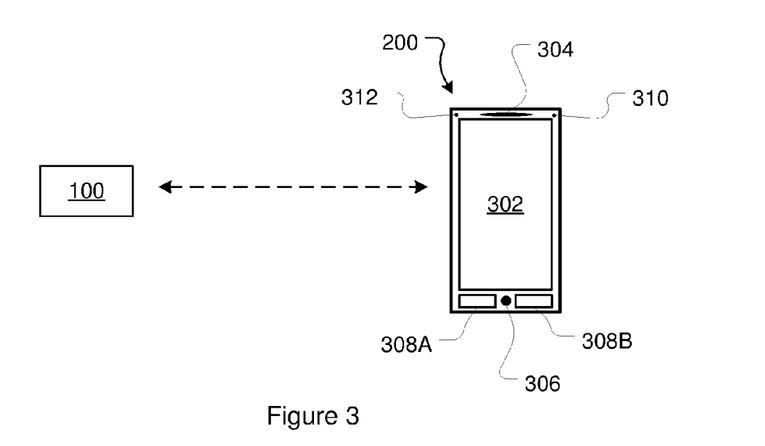
FIG. 3 depicts a proximity monitoring system comprising a credit-card type small form factor device and a mobile phone portable electronic device in accordance with one embodiment.

In one particular embodiment portable electronic device 200 is a mobile phone (e.g., a smart phone). This is advantageous as many people carry a mobile phone as a matter of course. As generally depicted in FIG. 3, and by way of non-limiting example, a mobile phone portable electronic device may have (in a physically integrated manner): a touchscreen display 302 (providing both input means and display output means); an audio output device 304 (e.g. a speaker); an audio input device 306 (e.g. a microphone); one or more physical inputs (e.g. physical buttons 308A and 308B); a location monitoring module 310 (e.g. a position sensor such as a GPS module); and a wireless communications module 312 for direct communication with other devices (e.g. a Bluetooth communications module). A mobile phone portable electronic device will, of course, include additional components as described above (processing unit, memory, telecommunications network interface(s) etc.).

Operation of the portable electronic device 200 is also caused by one or more computer program modules which configure portable electronic device 200 to receive, process, and output data. One such computer program module will be an operating system such as (by way of non-limiting example) Apple iOS or Android.

Portable electronic device 200 comprises additional computer program modules executed to cause the portable electronic device to perform the processes/operations described below. Where software modules are used, instructions and data are stored in non-transient memory such as 210, loaded into volatile memory 208, and executed by the processing unit 202.

Proximity Monitoring

As described generally above, the small form factor device 100 and portable electronic device 200 are configured and operated to take part in a proximity monitoring process whereby the portable electronic device 200 (the monitoring device) maintains an awareness of the proximity of the small form factor device 100 (the monitored device). This will be referred to as the "normal" proximity monitoring process.

By way of general overview, proximity monitoring is achieved by the small form factor device 100 communicating with the portable electronic device 200 in accordance with a small form factor device monitoring profile. If the portable electronic device 200 does not receive communications from the small form factor device as expected an alarm is raised.

The monitoring process involves a trade-off between security and power consumption (bearing in mind that the power source 118 of the small form factor of device 100 is itself small and has relatively limited capacity). Operating the small form factor device 100 to transmit to the portable electronic device 200 relatively frequently allows for greater security but also requires greater power consumption from the power source 118 of the small form factor device 100. Conversely, operating the small form factor device 100 to transmit to the portable electronic device 200 less frequently provides less security but also reduces power consumption from the power source 118 of the small form factor device 100.

In order to extend the life of the power source 118 of the small form factor device 100 embodiments involve determining whether the small form factor device 100 is in motion or stationary. If the small form factor device 100 is determined to have been stationary for a threshold time period power saving measures are implemented.

A general description of the initialization of the small form factor device 100 and portable electronic device 200 will be described, followed by a description of a typical proximity monitoring process. Operation/configuration of the small form factor device 100 and portable electronic device 200 in the power saving processes will then be described.

The various processes will be described in terms of computer program modules which are executed to cause various process steps or functions to be performed. It will be appreciated that the specific modules and steps are provided for descriptive purposes and are not intended to be limiting. For example: a given module could achieve additional, alternative, or fewer functions/operations than those described; a given module could achieve functions in an alternative manner to that described; the various functions described could be distributed between modules in an alternative manner; a module as described could be divided into multiple separate modules; and/or multiple described modules could be combined in to a single module.

Commissioning

The small form factor device 100 and portable electronic device 200 each store commissioning modules which are executed in order to establish an initial connection between each other (in order to enable the transmission of data between each other).

In one embodiment, the small form factor device 100 is initially supplied (i.e. as shipped from the factory) powered off and in an uncommissioned state.

In order to commission the small form factor device 100 a user activates the small form factor device 100 by the user input 112. This may, for example, be by a long press of a button input or similar (the long press reducing the likelihood that the small form factor device 100 will be inadvertently activated during transport). On activation the small form factor device 100 transitions into an advertising state where it advertises its presence (using the communications module) for a predefined period of time (e.g. 65 seconds).

If no connection is made in the predefined time period the small form factor device 100 is not commissioned and transitions back to the off state. This avoids power draw during manufacturing and/or transit where the user input can be unintentionally pressed.

If a connection is made with an expecting portable electronic device 200, the connection is maintained while the portable electronic device 200 checks with the user that the correct small form factor device 100 is connected. This may be achieved, for example, by flashing the light output 114 on the small form factor device and asking the user to confirm the flashing light by activation of the user input 112.

If the portable electronic device 200 receives confirmation, the small form factor device 100 is connected (as confirmed by the user) and the small form factor device 100 is commissioned. The portable electronic device 200 keeps track of a unique small form factor device identifier (e.g. the Bluetooth MAC address) for future communications.

If no confirmation is received, the portable electronic device 200 disconnects from the small form factor device 100 and the small form factor device 100 is not commissioned.

Alternative commissioning processes are possible.

Monitoring Profiles

In one embodiment, the small form factor device 100 stores a monitoring profile (e.g. in non-transient memory 104A) and the portable electronic device 200 stores an alarm profile (e.g. in non-transient memory 210).

A small form factor device monitoring profile defines how the communications module 106 of the small form factor device 100 is operated in the context of the proximity monitoring process. At a general level, the monitoring profile defines how frequently the small form factor device transmits communications.

In one embodiment, communications are via Bluetooth. In one embodiment, the small form factor device monitoring profile comprises: a transmission delay td (defining the delay between successive operations of the communications module 106 to transmit), an advertisement duration ad (defining the maximum duration the small form factor device 100 advertises its presence each time it transmits); and a connection duration cd (defining how long the small form factor device maintains a connection made with the portable electronic device provided the connection is not broken by external factors).

For example, a small form factor device monitoring profile may define: a frequency value of td=15 seconds (defining that transmissions are to be made 15 seconds after completion of the last transmission/communication), an advertising duration of ad=30 seconds (defining that the device will advertise for 30 seconds unless a connection is made sooner), and a connection duration value of cd=20 seconds (defining that any connection made is maintained for 20 seconds unless the connection is terminated sooner).

In one embodiment the small form factor device 100 stores a single monitoring profile. In alternative embodiments the small form factor device 100 stores multiple different profiles for implementation in different scenarios. Where multiple monitoring profiles are stored by the small form factor device 100 each monitoring profile may further comprise a unique identifier. Whether one or multiple monitoring profiles are stored, the details of a given monitoring profile may be altered, for example by appropriate instructions received from the portable electronic device 200 during a communication.

A portable electronic device alarm profile defines alarm criteria indicating when an alarm is to be raised. The term "alarm criteria" is used herein, however it will be understood that a given set of alarm criteria may comprise a single criterion or multiple criteria to be logically assessed. In one embodiment the alarm criteria comprises an alarm timeout value indicating the maximum time which can elapse without detecting an advertisement from the small form factor device 100 and/or connecting to the small form factor device 100. If no advertisement is detected/connection is made for longer than the time out value an alarm is raised. An alarm timeout value of a seconds defines that an alarm is to be raised if no transmission is received from the small form factor device 100 in a seconds.

The alarm criteria also comprises an expected transmission time, defining how long after completing a connection with the small form factor device 100, the portable electronic device 200 should expect to receive the next transmission from the small form factor device 100. An expected transmission time corresponds to the variables of a corresponding small form factor device monitoring profile, and in particular the transmission delay and advertising duration. Continuing with the above example (in which the transmission delay is 15 seconds, the advertising duration is 30 seconds), the corresponding expected transmission time would be 45 seconds: on completion of a connection with the small form factor device 100 the portable electronic device 200 would expect to receive the next communication within 45 seconds (the 45 seconds accounting for a 15 second transmission delay and a 30 second advertising duration).

Typically the alarm timeout is a multiple of the expected transmission time corresponding to the active small form factor device monitoring profile. For example, if the expected transmission time is t seconds, the alarm timeout would be x*t seconds (x being an integer value greater than or equal to 1).

The portable electronic device 200 may store multiple different alarm profiles—either for use with alternative corresponding small form factor device monitoring profiles, or for use in different scenarios (e.g. an alarm profile for a "safe" scenario may permit a greater number of consecutive expected transmissions from the small form factor device 100 to be missed before raising an alarm, while a higher risk scenario may permit fewer consecutive expected transmissions to be missed before raising an alarm).

Where multiple monitoring profiles are stored by the portable electronic device 200 each profile may further comprise a unique identifier.

A portable electronic device alarm profile may also take into account the signal strength of transmissions received from the small form factor device 100, the signal strength used as an indication of the distance separating the small form factor device 100 from the portable electronic device 200. For example, a portable electronic device alarm profile may require a transmission from the small form factor device 100 to be above a threshold signal strength in order to be treated as received.

The portable electronic device alarm profile and the small form factor device monitoring profile define the sensitivity of the proximity monitoring process. If the alarm time out is equal to the expected transmission time (i.e. a=1*t) the process will be highly sensitive. For example, an alarm time out of 45 seconds and an expected transmission time of 45 seconds will mean that an alarm is raised in the event the portable electronic device 200 misses (does not receive) a single expected transmission from the small form factor device 100. This may be advantageous in some circumstances, but in others it may result in false alarms being raised which can lead to user irritation/frustration. In contrast, an alarm time out value of higher order multiples of the transmission frequency provides a less sensitive proximity monitoring process. For example, an alarm time out value of 135 seconds used with an expected transmission time of 45 seconds will mean that the portable electronic device 200 can miss three consecutive expected transmissions from the small form factor device 100 before raising an alarm.

A portable electronic device alarm profile also defines how an alarm is actually raised if triggered—e.g. a visual alarm displayed on a display or by a flashing light or similar, an audible alarm emitted by a speaker, a haptic alarm emitted by operating a vibration device, or combinations thereof. In addition, or alternatively, the portable electronic device 200 may be configured to alert a user by automatically generating and sending a message (e.g. an email message, SMS, voice message or other electronic message) or calling a particular number.

In some embodiments the small form factor device 100 and portable electronic device 200 may each store a single monitoring/alarm profile which (by default) will be the active profiles. In other embodiments the small form factor device 100 and portable electronic device 200 may each store multiple monitoring/alarm profiles. In this case the portable electronic device 200 is configured to communicate instructions to the small form factor device 100 informing it of which small form factor device monitoring profile should be implemented/made active (e.g. by reference to a relevant monitoring profile ID) and, at the same time, to implement the corresponding portable electronic device alarm profile itself. The portable electronic device may be further configured to transmit new or updated monitoring profile values to the small form factor device 100 (which receives the new/updated values and stores them in memory 104A).

In still further embodiments, the portable electronic device 200 alone may be configured to store one or more monitoring and alarm profiles. In this case a portable electronic device monitoring profile defines an interrogation frequency at which the portable electronic device 200 is operated to transmit an interrogation/advertisement to the small form factor device 100 (e.g. every 30 seconds). On transmission of an interrogation/advertisement the portable electronic device 200 expects to receive a response from (or connect with) the small form factor device 100 and alarm criteria are based around whether responses are received/connections are made or not in a similar fashion to the alarm criteria described above. In this embodiment the small form factor device 100 does not implement its own monitoring profile, but is rather configured to simply transmit a response message (or connect to the portable electronic device 200) in response to receiving an interrogation/advertisement from the portable electronic device 200.

Proximity Monitoring Operation/Configuration

In one embodiment, to implement a proximity monitoring process the small form factor device 100 is provided with a small form factor device proximity monitoring module for execution, and the portable electronic device 200 is provided with a portable electronic device proximity monitoring module for execution.

The small form factor device and portable electronic device proximity monitoring modules are executed after the small form factor device 100 and portable electronic device 200 have been configured to communicate with one another (e.g. per the pairing/bonding process described above or an alternative process), and while a corresponding pair of monitoring profiles (i.e. a small form factor device monitoring profile and a corresponding portable electronic device monitoring profile) are active.

Figure 4:
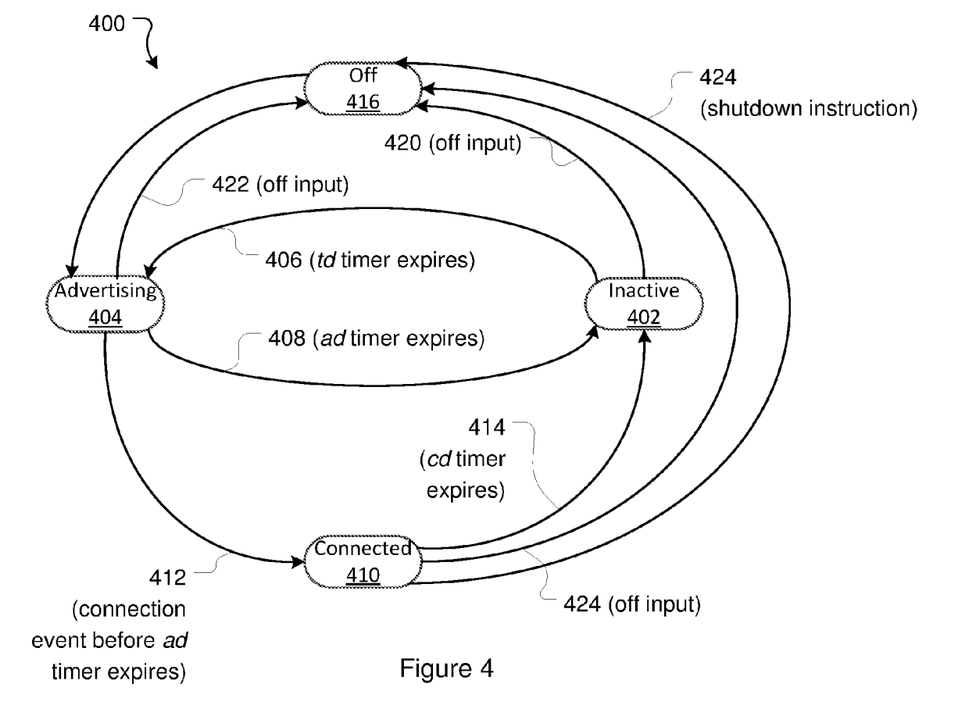
FIG. 4 is a state diagram depicting operation of a small form factor device during a proximity monitoring process in accordance with an embodiment.

FIG. 4 provides a state diagram 400 depicting the states (and state transitions) of the small form factor device 100 during the monitoring process.

In inactive state 402 the small form factor device 100 is not transmitting communications. In this state the small form factor device 100 maintains a transmission timer (set at the transmission delay value td as defined by the monitoring profile).

When the transmission timer expires, the small form factor device 100 transitions from the inactive state to the advertising state 404 (transition 406).

In the advertising state the communications module 106 of the small form factor device 100 is operated to advertise its presence until an advertising timer expires (the advertising timer set to the advertising duration ad as defined by the monitoring profile).

If the advertising timer expires without a connection being made, the small form factor device 100 transitions back to the inactive state (transition 408).

If a connection is made before the advertising timer expires, the small form factor device 100 transitions to the connected state 410 (transition 412). In the connected state 410 the small form factor device 100 is connected to the portable electronic device 200 and can receive instructions from the portable electronic device 200 (for example instructions to update the monitoring profile, shut down or the like). The small form factor device 100 also maintains a connection timer (set at the connection duration value cd as defined by the monitoring profile).

When the connection timer expires, the small form factor device transitions back to the inactive state 402 (transition 414) and the advertising/connection cycle recommences.

If in the connection state 410 the small form factor device 100 receives a shutdown instruction from the portable electronic device 200, the small form factor device 100 transitions to an off state 416 (transition 418) in which the small form factor device is shut down completely.

The small form factor device 100 may also transition to the off state 416 from the inactive state 402 (transition 420), the advertising state 404 (422), or the connected state 410 (transition 424). These transitions are in response to a user manually switching the small form factor device off, e.g. by a defined activation of the user input 112 (a long button press or the like).

While in the off state 416 a defined activation of the user input 112 (e.g. a long button press or the like) turns the small form factor device 100 back on. In this particular embodiment turning the small form factor device 100 back on transitions it to the advertising state 404 (transition 426).

Alternative processes and operations to achieve the small form factor device side of the proximity monitoring process are possible.

Figure 5:
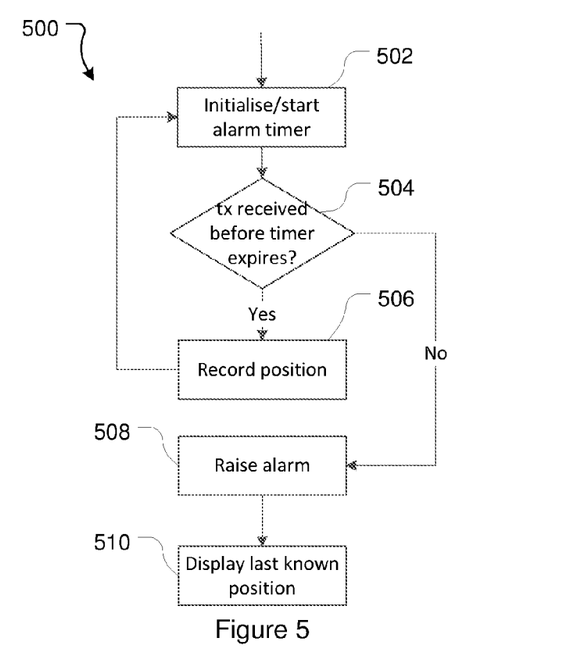
FIG. 5 is a flowchart illustrating a portable electronic device proximity monitoring process in accordance with an embodiment.

FIG. 5 provides a flowchart of the portable electronic device proximity monitoring process 500 (enabled by the portable electronic device proximity monitoring module) in accordance with one embodiment.

At 502 the portable electronic device 200 initialises an alarm timer to zero and starts it counting.

At 504 the portable electronic device 200 awaits receipt of an advertisement from the small form factor device 100 until the alarm timer reaches a seconds (a being the alarm time out defined by the active portable electronic device alarm profile).

At 506, if an advertisement is received from the small form factor device 100 before the alarm timer expires (reaches a) the portable electronic device determines and makes a record of its own location at the time (or approximate time) the advertisement from the small form factor device 100 was received. The location of the portable electronic device 200 is determined from the location monitoring module 310, cell tower reception data, and/or other available location/positional information. The process then returns to 502 (i.e. the alarm timer is reset to zero and restarted, and the next transmission is awaited).

If the alarm timer expires (reaches a) before an advertisement is received from the small form factor device 100, the portable electronic device 200 raises an alarm at 508.

At 510 the portable electronic device also informs the user of the estimated last position of the small form factor device 100. This is achieved, for example, by displaying a map or similar to the user and plotting the recorded position of the portable electronic device 200 at the last transmission received from the small form factor device 100. A current position of the portable electronic device 200 may also be displayed to allow the user to easily determine how to return to the estimated last position of the small form factor device 100.

In one embodiment the portable electronic device 200 maintains an expected transmission timer (corresponding to the value of the expected transmission time of the alarm profile). The expected transmission timer is restarted each time a communication with the small form factor device 100 concludes. If the expected transmission timer reaches expected transmission time value, the portable electronic device 200 logs a missed transmission, records its own location at that time, and restarts the expected transmission timer. By logging missed expected transmissions, if the alarm criteria are met at a time when the portable electronic device 200 cannot adequately determine its location it may be possible to review the log of recent missed transmissions and use the recorded location at a missed transmission to provide location information to the user.

Alternative processes and operations to achieve the portable electronic device side of the proximity monitoring process are possible. For example, in one embodiment the portable electronic device 200 may be limited to simply raising an alert if the alarm timer expires (reaches a) before a transmission from the small form factor device 100 is received (and not display a last known position of the small form factor device 100). In this case it may not be necessary to determine and record the position of the portable electronic device 200 when transmissions are received from the small form factor device 100 (at 506) or display the last known position (at 510).

Power Saving Operation/Configuration

Figure 6:
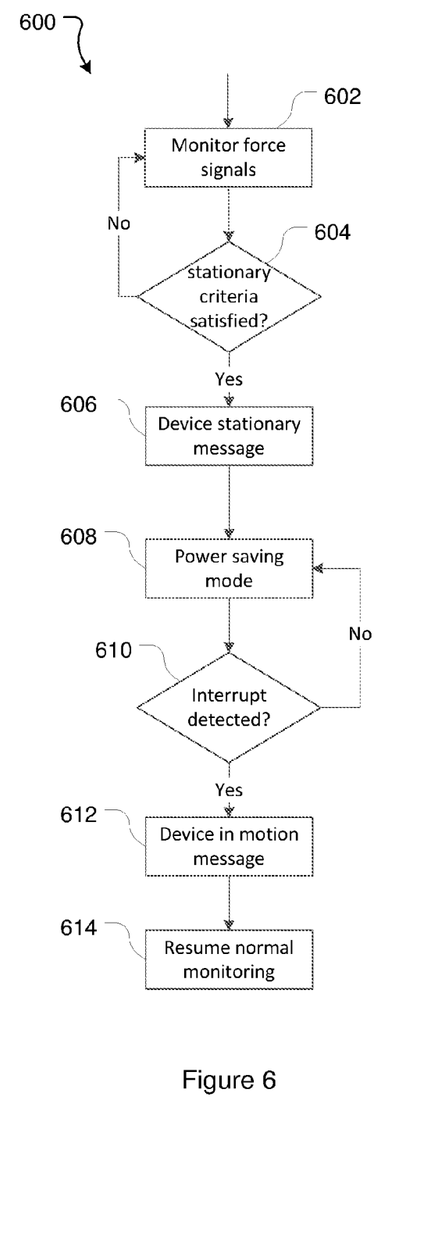
FIG. 6 is a flowchart illustrating a small form factor device power saving process in accordance with an embodiment.

FIG. 6 provides a flowchart of a small form factor device power saving process 600 (enabled by the small form factor device power saving module) in accordance with one embodiment. It will be appreciated that not all operations described and illustrated with respect to FIG. 6 will be necessary in all embodiments, that additional operations may be implemented, and that the order of certain operations may be varied.

Power saving process 600 makes use of device stationary criteria which are used by processor 102 to determine whether or not certain power saving operations are to be implemented. The term "device stationary criteria" is used herein, however it will be understood that a given set of device stationary criteria may comprise a single criterion or multiple criteria to be logically assessed. Generally speaking, the device stationary criteria are set to be satisfied when the small form factor device 100 is determined to have been stationary for a predetermined time period. This may occur, for example, when a user leaves the item or possession (e.g. a wallet) holding the small form factor device 100 in the same place for an extended period of time. For example a wallet left in a desk drawer during the course of a day, or on a bedside table overnight. The predetermined time period can be selected as appropriate, ideally to reduce rapid transitions into and out of the power saving mode. Suitable values may be the device 100 being determined to be stationary for 5 minutes. Alternative times may also be suitable depending on circumstances, for example 1 minute, 2 minutes, 3 minutes, 4 minutes, 10 minutes, 15 minutes.

At 602 the processor 102 of the small form factor device monitors force signals from the force sensor 108 to determine whether or not the device stationary criteria are satisfied. Where the force sensor 108 is an accelerometer (or group of accelerometers) force signals are generated and transmitted to the processor 102 on acceleration of the small form factor device 100 (for example as the device is carried around).

At 604, the processor 102 processes the force signals to determine whether the small form factor device stationary criteria are satisfied.

The precise manner in which the device stationary criteria are defined/implemented will depend on the hardware used. For example, in one embodiment the accelerometer may be configured to communicate an interrupt to the processor if no movement is detected for the predetermined time period. In this case the device stationary criteria are satisfied on the processor 102 receiving such a message/interrupt from the accelerometer.

In other embodiments the accelerometer may be configured to signal the processor 102 when movement (or movement above a particular threshold) is detected. In this case the processor 102 starts a counter when no signal is detected from the accelerometer and resets the counter each time the movement signal from the accelerometer is received. If the counter reaches the defined time period the device stationary criteria are deemed satisfied. In this case determining whether device stationary criteria are satisfied is based on the absence of force signals received from the force sensor.

In still further embodiments the processor 102 may periodically poll the force sensor to determine the reading of the force sensor at the various polling intervals.

While reference is made to determining device stationary criteria based on force signals received from the force sensor, it will be appreciated that the determination may also/alternatively be made based on the absence of force signals received from the force sensor.

If the device stationary criteria are not satisfied the process returns to 602.

At 606, if the device stationary criteria are satisfied, the processor 102 causes the communications module 106 to transmit a device stationary message to the portable electronic device 200.

At 608, the small form factor device 100 then enters a power saving mode. In the power saving mode the active small form factor device monitoring profile is suspended so that the small form factor device 100 does not operate the communications module 106 to communicate with the portable electronic device 200 in accordance with the active monitoring profile (thereby saving power).

In some embodiments the small form factor device 100 may be configured not to initiate communicates at all with the portable electronic device 200 while in the power saving mode.

In other embodiments, while in the power saving mode, the small form factor device 100 may be configured to initiate communications with the portable electronic device 200 on a reduced frequency basis (i.e. at a lesser frequency than is dictated by the active monitoring profile). For example, if the active monitoring profile defines a transmission delay of 15 seconds, the power saving mode may define an extended transmission delay of 150 seconds. Longer delays are of course possible. The extended transmission delay implemented during the power saving mode may be defined in terms of a multiple of the transmission delay of the monitoring profile—e.g. 10× the transmission delay, 20× the transmission delay, 50× the transmission delay, 100× the transmission delay etc.

Depending again on the hardware used, the power saving mode may also involve the processor 102 and/or the accelerometer entering a low-power or sleep mode. For example, the ADXL362 accelerometer has a low power mode which the accelerometer is woken from on detection of movement. Where an accelerometer with such a mode is used, the processor and accelerometer may both sleep in the small form factor device power saving mode. If the small form factor device 100 is moved, the motion will be detected by the accelerometer which will wake and send an interrupt to the processor 102. At 610, in the power saving mode, processor 102 awaits the occurrence of a power save interrupt event. One power save interrupt event is the processor 102 detecting (via the force sensor 108) that the device is in motion. Additional interrupt events may also be defined—for example interrupt events may further comprise activation of the user input 112 and/or receipt of an interrupt message from the portable electronic device 200. If interrupt messages are to be received from the portable electronic device 200 the small form factor device 100 is configured to be able to receive such messages while in the power saving mode.

If no power save interrupt event is detected at 610 the small form factor device 100 remains in the power saving mode.

If a power save interrupt event is detected at 610, the small form factor device 100 exits the power saving mode. This involves the processor 102 causing the transmission of a device in motion message to the portable electronic device at 612 and resuming "normal" proximity monitoring behaviour in accordance with the active proximity monitoring profile at 614 (for example, per the small form factor device proximity monitoring process 400 described above).

Figure 7:
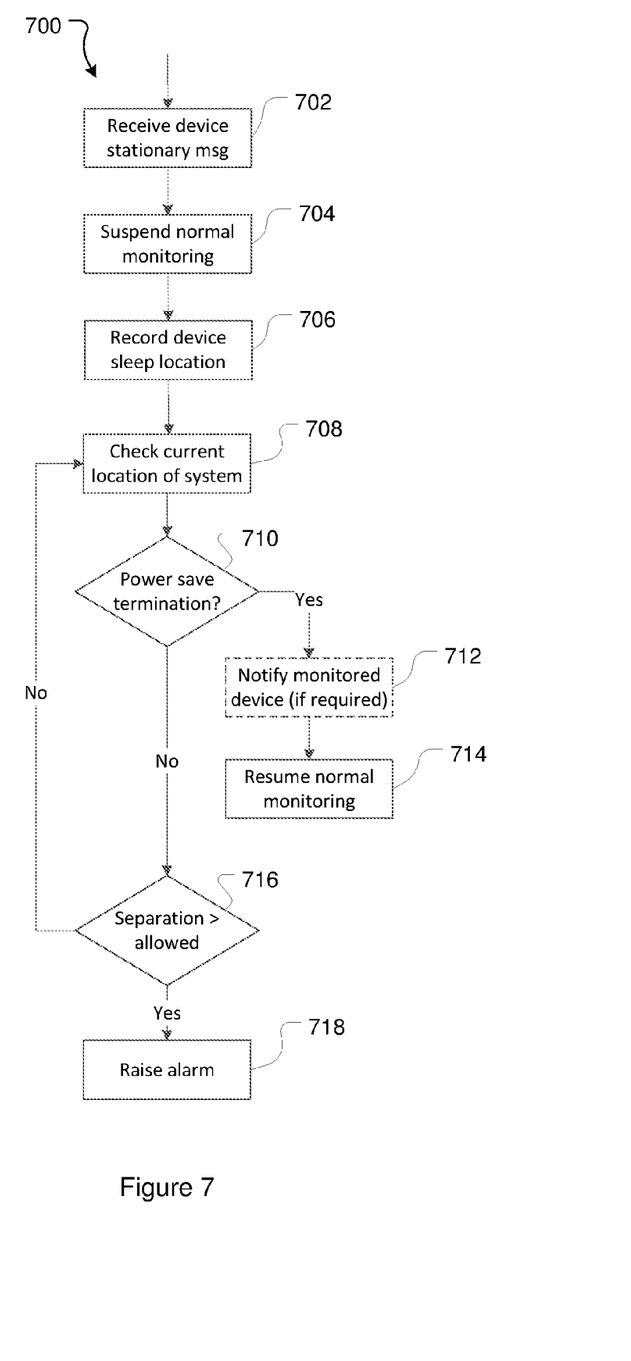
FIG. 7 is a flowchart illustrating a portable electronic device power saving process in accordance with an embodiment.

FIG. 7 provides a flowchart of the portable electronic device power saving process 700 (enabled by the portable electronic device power saving module) corresponding to the small form factor device power saving process 700 and in accordance with an embodiment. While process 700 is referred to as a portable electronic device power saving process, it will be understood that the process does not necessarily involve a power saving for the portable electronic device 200 itself—rather the process is the complementary process to the small form factor device power saving process and thus enables power savings for the small form factor device 100. Saving power for the portable electronic device 200 is less critical given the larger battery typically carried by a portable electronic device and as users are habituated to charging such portable electronic devices regularly.

At 702 the portable electronic device 200 receives a device stationary message from the small form factor device 100. This triggers the implementation of a power saving mode by the portable electronic device 200.

At 704 the portable electronic device 200 suspends monitoring in accordance with the active portable electronic device 200 monitoring profile.

At 706 the processing unit 202 determines the location of the portable electronic device 200 at the time (or approximate time) the device stationary message was received from the small form factor device and stores this. The location of the portable electronic device 200 is determined from the location monitoring module 310, cell tower reception data, and/or other available location/positional information. This stored location will be referred to as the device sleep location and is indicative of the location of the small form factor device 100 at the time it was determined to be stationary. In this embodiment, if the location of the portable electronic device 200 at the time the device stationary message is received cannot be determined (e.g. due to an absence of GPS or and other location/positional information), the device sleep location is recorded as the last known position of the portable electronic device 200.

The portable electronic device 200 then implements a monitoring loop that involves periodically rechecking its own location and comparing it against the device sleep location.

At 708 the portable electronic device 200 checks its current location. This occurs at predefined time intervals (e.g. every 2 seconds, 5 seconds, 10 seconds, every 30 seconds, every minute, every 2 minutes, or other interval).

At 710 the portable electronic device 200 checks to see if a power save mode termination event has occurred.

One termination event is receipt of a device in motion message from the small form factor device 100.

Another termination event may involve a user manually electing to resume exit the power saving mode and resume normal proximity monitoring behaviour. For example, the user may be presented with (or navigate to) a "resume normal monitoring" control by the portable electronic device 200.

Another termination event may be if, during the power saving mode, the accuracy with which the portable electronic device 200 is able to determine its own location falls below a predefined acceptable accuracy (e.g. due to the portable electronic device 200 having limited access to positional information such as GPS, cell tower, and/or other signals from which position can be determined).

A further termination event may be if the portable electronic device 200 detects a scenario in which the power save mode is not permitted. For example, the portable electronic may be configured with scenario criteria defining when operation in the power saving mode is permitted (or, conversely, when it is not permitted). In one particular example, scenario criteria may relate to physical areas (e.g. geofences) defined by the user or by the monitoring application itself. Physical areas may be defined as safe areas (e.g. at the user's home or at the user's office) in which the power saving mode is permitted. Physical areas may also be defined as unsafe areas (e.g. notorious theft areas) in which the power saving mode is not permitted. In this case a termination event occurs if the portable electronic device 200 detects that it has moved out of a safe area or into an unsafe area.

If a power save mode termination event has occurred, and if necessary, the portable electronic device 200 transmits a resume monitoring message to the small form factor device 100 (which is received as an interrupt event and causes the small form factor device 100 to resume transmitting advertisements in accordance with the normal proximity monitoring process). Whether or not a resume monitoring message needs to be sent depends on whether the termination event was triggered by the small form factor device 100 of the portable electronic device 200. If the termination event was triggered by the small form factor device (e.g. due to receiving a device in motion message) no resume monitoring message is necessary. Conversely, if the termination event was triggered by/at the portable electronic device 200 (e.g. due to a manual user input or a lack of positional accuracy) a resume monitoring message will need to be transmitted.

For descriptive purposes monitoring for the occurrence of a power save mode termination event has been illustrated as a sequential event 710. It will be appreciated, however, that a termination event could occur (and be acted on) at any point throughout process 700.

At 716 (provided no power save mode termination event has occurred) the portable electronic device 200 calculates whether the distance between its current location (determined at 708) and the device sleep location (determined at 706) exceeds a predefined allowable separation distance. The allowable separation distance takes into account the accuracy with which the portable electronic device 200 is able to determine its location (e.g. based on GPS error). After taking this accuracy into account, the allowable separation distance may be any desired distance, for example, 2 m, 5 m, 10 m, 15 m, 20 m or another distance. In order to more accurately determine location (and/or whether the portable electronic device 200 has exceeded the predefined allowable separation distance) additional positional or movement information may be taken into account. For example, the portable electronic device 200 may be provided with an accelerometer/gyro and compass which can be used (alone or together with available GPS and/or cellular reception information) to determine movement of the portable electronic device 200.

If the distance between the current location of the portable electronic device 200 and the device sleep location exceeds the allowable separation distance, an alarm is raised at 718. As with the alarm procedure described above, the alarm may be visual, audible, and/or haptic. Raising the alarm may also involve the processor 202 displaying a map to the user showing the recorded device sleep location as an indication of the area in which the small form factor device 100 should be located (and, potentially, the current device location to assist the user in returning to the device sleep location).

By not requiring the small form factor device 100 to communicate advertisement messages while not in motion, the life of the power source of the small form factor device 100 is conserved. At the same time, however, the portable electronic device 200 (which both has a larger power supply and is more routinely recharged) effectively takes over the process of monitoring the location of the small form factor device 100 based on the last recorded position of the small form factor device 100 and (so long as no message is received indicating that the small form factor device 100 is in motion) the fact that the small form factor device has not moved from that location.

Figure 8:
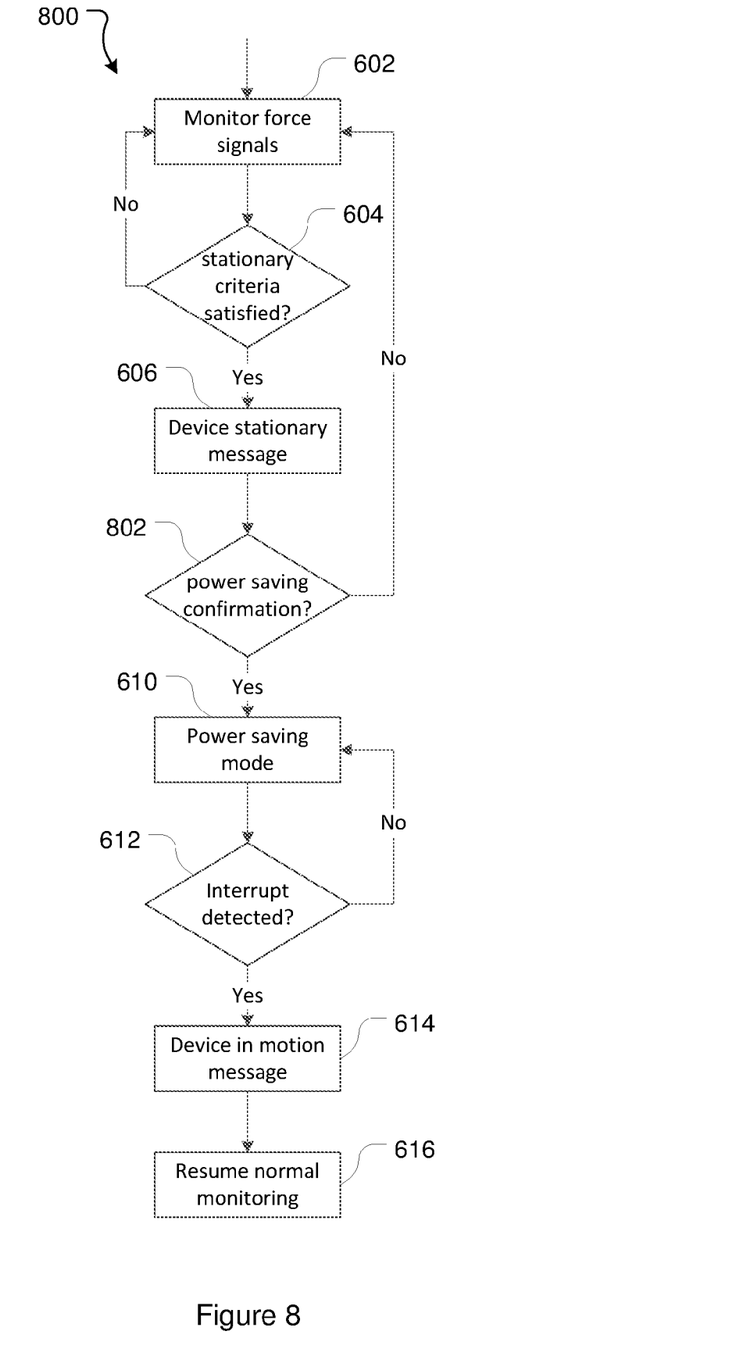
FIG. 8 is a flowchart illustrating a small form factor device power saving process in accordance with an alternative embodiment.
Figure 9:
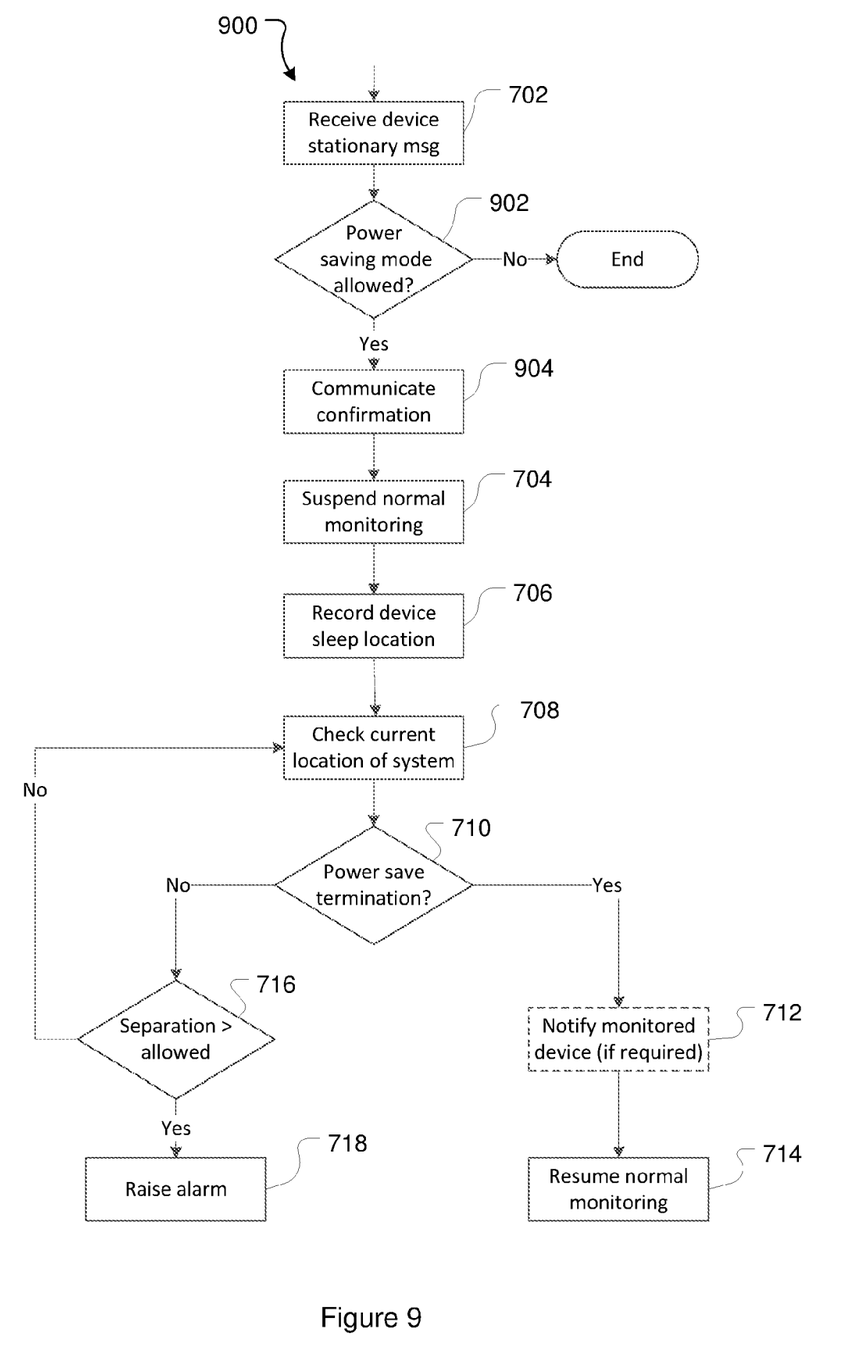
FIG. 9 is a flowchart illustrating a portable electronic device power saving process in accordance with an alternative embodiment.

FIGS. 8 and 9 respectively depict a small form factor device power saving process 800 and corresponding portable electronic device power saving process 900 in accordance with alternative embodiments.

Power saving process 800 (implemented by the small form factor device 100) shares many of the same operations as power saving process 600 and for convenience the same reference numerals have been used (and these operations will not be described again).

Power saving process 800 involves operations 602, 604 and 606 of process 600 as described above in order to determine whether small form factor device stationary criteria are satisfied and, if so, transmit a device stationary message.

In process 800, however, after transmitting a device stationary message to the portable electronic device 200 (at 606) the small form factor device 100 awaits a power saving confirmation message from the portable electronic device 200 (at 802). If no power saving confirmation message is received within a defined time period (or a negative confirmation message is received from the portable electronic device 200 denying entry into the power saving mode) the power saving mode is not entered and the process returns to 602. On failing to receive a power saving confirmation message within the defined time period (or receiving a power saving denial message) at 802 the processor 102 of the small form factor device 100 may apply an alternative device stationary criteria (e.g. so that a longer stationary period must be detected before a further device stationary message is transmitted).

If a power saving confirmation message is received from the portable electronic device 200 at 802, the small form factor device enters the power saving mode and process 800 continues with operations 610, 612, 614, and 616 as described with respect to process 600 described above.

Process 900 is the portable electronic device power saving process corresponding to small form factor device power saving process 800. Power saving process 900 shares many of the same operations as portable electronic device power saving process 700 and for convenience the same reference numerals have been used (and these operations will not be described again).

At 702 the portable electronic device 200 receives a device stationary message from the small form factor device 100.

At 902 the portable electronic device 200 determines whether or not the small form factor device 100 is allowed to enter the power saving mode (i.e. to cease transmitting to the portable electronic device 200).

A variety of factors may go into this determination. For example, the portable electronic device 200 may be configured to determine that the small form factor device power saving mode is not allowed if the portable electronic device 200 cannot determine its own location to within a predefined acceptable accuracy (e.g. due to the portable electronic device 200 having limited access to positional information such as GPS, cell tower, and/or other signals from which position can be determined). In this case the portable electronic device may not be able to adequately determine the small form factor device sleep location, and/or take over the task of monitoring its own location against the small form factor device sleep location to determine its separation from the small form factor device sleep location.

Determination of whether or not implementation of the power saving mode is allowed may also (or alternatively) involve user input. For example, on receipt of a device stationary message from the small form factor device 100 the portable electronic device 200 may request confirmation from a user that entry into the power saving mode is allowed (e.g. by an appropriately displayed message and accept/reject control). If the user is comfortable with the power saving mode being implemented (e.g. due to being in a "safe" location such as home or work) he or she confirms this—leading to a determination that entering the power saving mode is allowed. If not (e.g. because the user is in a public or other location) the user issues a reject command—leading to a determination by the portable electronic device 200 that entering the power saving mode is not allowed.

Determination of whether or not implementation of the power saving mode is allowed may also (or alternatively) involve consideration of whether the portable electronic device is in a safe location or an unsafe location as described above. In a safe location entry into the power saving is permitted (provided no overriding considerations exist or events occur). In an unsafe location entry into the power saving mode is prevented (again provided no other overriding considerations exist or events occur).

If the power saving mode is determined not to be allowed at 902, the process terminates. In some embodiments the portable electronic device 200 may communicate a negative confirmation message to the small form factor device 100, while in other embodiments the portable electronic device 200 does not (in which case the small form factor device determines the power saving mode is not allowed by timing out).

If the power saving mode is determined to be allowed at 902, the portable electronic device 200 transmits a confirmation message to the small form factor device 100 at 904.

Following this the portable electronic device power saving process 900 continues as per the portable electronic device power saving process 700 described above.

In the embodiments described above, while in the power saving mode (entered at 608) the small form factor device 100 does not transmit advertisements to the portable electronic device 200 (and the portable electronic device 200 does not expect to receive advertisements from the small form factor device 100). In alternative embodiments, while in the power saving mode the small form factor device 100 may be configured to continue communicating advertisements to the portable electronic device 200 though less frequently than is defined by the active monitoring profile. In this case the portable electronic device power saving process involves monitoring for receipt of small form factor device advertisements at the lesser frequency (and basing alarm criteria on the receipt of otherwise of those expected advertisements).

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extends to all alternative combinations of two or more of the individual features mentioned or evident from the text or drawings. All of these different combinations constitute various alternative aspects.

The invention claimed is:

1. A small form factor device comprising:
a power source;
a force sensor for sensing forces applied to the small form factor device and generating force signals based thereon;
a wireless communications module powered by the power source, and
a processor powered by the power source, wherein the processor is configured to:
implement a proximity monitoring process involving periodically operating the wireless communications module to transmit advertisements;
determine whether device stationary criteria are satisfied based on force signals received from the force sensor or the absence of force signals received from the force sensor, and
if the device stationary criteria are satisfied, the processor is further configured to:
cause the wireless communications module to transmit a device stationary message; and
cause the small form factor device to enter a power saving mode in which the proximity monitoring process is suspended.

2. The small form factor device of claim 1, wherein if the small form factor device is determined to be in motion while in the power saving mode, the processor is configured to:
cause the wireless communications module to transmit a device in motion message; and
cause the small form factor device to exit the power saving mode and resume the proximity monitoring process.

3. The small form factor device of claim 1, wherein the device stationary criteria are satisfied if no force signals are received from the force sensor for a predetermined time period.

4. The small form factor device of claim 1, wherein the small form factor device has a credit card type form factor.

5. The small form factor device of claim 1, wherein the force sensor comprises an accelerometer.

6. The small form factor device of claim 1, wherein the wireless communications module is a Bluetooth communications module.

7. The small form factor device of claim 1, wherein if the small form factor device is determined to be in motion while in the power saving mode, the processor is configured to:
cause the small form factor device to exit the power saving mode and resume the proximity monitoring process.

8. A portable electronic device comprising:
a power source;
a wireless communications module powered by the power source;
an output device; and
a processing unit powered by the power source, wherein the processing unit is configured to:
implement a proximity monitoring process involving monitoring for the receipt of periodic advertisement transmissions from a monitored device through the wireless communications module;
if, during implementation of the proximity monitoring process alarm criteria are satisfied, operate the output device to output an alarm;
determine if the monitored device has been stationary for a threshold time period, and
in response to determining that the monitored device has been stationary for the threshold time period:
implement a power saving process in which the proximity monitoring process is suspended.

9. The portable electronic device of claim 8, further comprising a location monitoring module, and wherein in response to determining that the monitored device has been stationary for the threshold time period, the processing unit is further configured to:
determine a monitored device sleep position using the location monitoring module, the monitored device sleep position being a position of the portable electronic device at or about a time it is determined that the monitored device has been stationary for the threshold time period.

10. The portable electronic device of claim 9, wherein after determining the monitored device sleep position, the processing unit is further configured to:
periodically compare a current position of the portable electronic device to the monitored device sleep position to determine a current separation distance between the current position and the monitored device sleep position; and
if the separation distance exceeds a predetermined allowable separation distance, operate the output device to output an alarm.

11. The portable electronic device of claim 10 further comprising a display, and wherein if the current separation distance exceeds the predetermined allowable separation distance the processing unit is further configured to display the monitored device sleep position on the display.

12. The portable electronic device according to claim 8, wherein determining that the monitored device has been stationary for a threshold time period comprises receiving a device stationary message from the monitored device.

13. A computer-implemented method for operating a monitoring device to monitor the location of a monitored device, the method comprising:
implementing a proximity monitoring procedure involving monitoring for the receipt of periodic advertisement transmissions from the monitored device;
raising an alarm if alarm criteria are satisfied during implementation of the proximity monitoring procedure;
determining if the monitored device has been stationary for a threshold time period; and in response to determining that the monitored device has been stationary for the threshold time period:
implementing a power saving procedure in which the proximity monitoring procedure is suspended.

14. The computer-implemented method of claim 13, further, wherein in response to determining that the monitored device has been stationary for the threshold time period, the method further comprises determining a monitored device sleep position, the monitored device sleep position being a position of the monitoring device at or about a time it is determined that the monitored device has been stationary for the threshold time period.

15. The computer-implemented method of claim 14, wherein after determining the monitored device sleep position, the method further comprises:
periodically comparing a current position of the monitoring device to the monitored device sleep position to determine a current separation distance between the current position and the monitored device sleep position; and
raising an alarm if the separation distance exceeds a predetermined allowable separation distance.

16. The computer-implemented method of claim 15, wherein if the current separation distance exceeds the predetermined allowable separation distance the method further comprises displaying the monitored device sleep position on a display.

17. The computer-implemented method according to claim 13, wherein determining that the monitored device has been stationary for the threshold time period comprises receiving a device stationary message from the monitored device.

* * * * *